United States Patent [19]
Bradford

[11] Patent Number: 5,914,035
[45] Date of Patent: Jun. 22, 1999

[54] APPARATUS FOR SEPARATING WATER FROM A FLUID

[75] Inventor: Peter Francis Bradford, Sheppey, United Kingdom

[73] Assignee: Lucas Industries PLC, United Kingdom

[21] Appl. No.: 08/604,414

[22] Filed: Feb. 21, 1996

[30] Foreign Application Priority Data

Mar. 7, 1995 [GB] United Kingdom .................... 9504486

[51] Int. Cl.⁶ ................................................. B01D 35/30
[52] U.S. Cl. ......................... 210/232; 210/309; 210/439; 210/444; 55/499
[58] Field of Search .................................. 210/303, 305, 210/307, 309, 312, 232, 519, 444, 439, 94, 450, 308, 438; 137/172; 220/293; 55/497, 498, 499

[56] References Cited

U.S. PATENT DOCUMENTS

| | | | |
|---|---|---|---|
| 2,621,796 | 12/1952 | Wilkenson | 210/450 |
| 3,312,351 | 4/1967 | Kasten | 210/444 |
| 3,662,895 | 5/1972 | Tuffnell et al. | 210/439 |
| 4,203,686 | 5/1980 | Bowman | 220/293 |
| 5,071,177 | 12/1991 | Spiess et al. | 292/91 |

FOREIGN PATENT DOCUMENTS

| | | | |
|---|---|---|---|
| 253473 | 5/1963 | Australia | 210/439 |
| 0529286 | 7/1992 | European Pat. Off. | B01D 35/30 |
| 659 997 A1 | 12/1994 | European Pat. Off. | B01D 35/14 |
| 1603397 | 11/1990 | U.S.S.R. | |
| 903505 | 8/1962 | United Kingdom | 210/307 |
| 2078536 | 6/1981 | United Kingdom | B01D 27/00 |

Primary Examiner—Matthew O. Savage
Attorney, Agent, or Firm—Sheridan Ross P.C.

[57] ABSTRACT

The fluid treatment apparatus may comprise a sedimenter or agglomerator for insertion in a fuel line between a fuel tank and a fuel injection pump in order to remove dirt particles and water from diesel fuel passing along the fuel line. A water reservoir (4) is positioned at the bottom of the apparatus in order to collect the water removed from the fuel. In order to avoid applying a compressive clamping force to the side wall (17) of the water reservoir (4), the arrangement is such as to clamp only the top part of the side wall (17) [as shown in FIG. 1] or else to apply no clamping force at all to the water reservoir (4) [see FIG. 16]. This enables the water reservoir (4) to be made of cheap plastics material.

1 Claim, 7 Drawing Sheets

APPARATUS FOR SEPARATING WATER FROM A FLUID

The present invention relates to fluid treatment apparatus suitable for separating water from a water-contaminated fluid. The preferred, but not exclusive, application of the present invention is in relation to removing water from diesel fuel by inserting the apparatus in a fuel line leading from a fuel tank to a fuel injection pump.

In the prior art, it is known to insert filters, agglomerators, sedimenters and waterstops in the fuel line between the fuel tank and the fuel injection pump. A filter is used primarily to remove solid particles which are contaminating the fuel. An agglomerator uses a filter element to remove solid particles and the filter element also serves to separate out water from the fuel by having a central tube and requiring the filtered fuel which flows downwards out of the bottom of the filter element to turn radially inwards and then flow upwards into the central tube. The water separates out and is collected in the bottom of the device. A sedimenter dispenses with the filter element of the agglomerator and instead uses a diffuser cone to induce radial flow to separate the solid particles and water from the fuel. A waterstop is a more elaborate version of a sedimenter and includes a probe for detecting the amount of water that has collected in the device.

In a traditional agglomerator, there is a stack of components with a head which has a fuel inlet and a fuel outlet. Beneath the head is a filter element. Beneath the filter element is a bowl-shaped water reservoir. The three components are clamped together by a central rod which extends from the head to the water reservoir. The bottom of the central rod acts on the base of the water reservoir. For example, it may extend through the base of the water reservoir with a nut being screwed to the bottom end of the central rod so as to transfer the tension force of the central rod to the water reservoir. Alternatively, the bottom end of the central rod may extend through the base of the water reservoir and be screwed into a metal cover plate which distributes the tension force of the central rod across the entire base of the water reservoir.

Apart from a base, the water reservoir also includes a generally cylindrical side wall and this side wall is placed in compression by the tension in the central rod. It is usual for the water reservoir to be made of transparent material, such as glass or plastics, so as to enable the level of collected water to be monitored. Unfortunately, because the side wall of the water reservoir is placed in compression, there is a risk of the water reservoir shattering if made of glass. If made of plastics material, the material used must be of high quality and thus relatively expensive if the resulting water reservoir is to be capable of withstanding the compression in the side wall.

EP-A-529,286 discloses a variant in which the central rod extends from the base of the filter element to the base of the water reservoir.

GB-A-2,078,536 discloses a variant which is not held together with a central rod. Instead, the top of the water reservoir is screwed to the base of the filter element.

According to a first aspect of the present invention, there is provided fluid treatment apparatus for separating water from a water-contaminated fluid, comprising: a water separation device having a downwardly opening, first aperture; a water reservoir including an annular side wall at the top of which is an upwardly opening, second aperture; and a support connected to the water separation device and projecting out of the first aperture and into the second aperture and extending to the top of the side wall of the water reservoir so as to clamp the water reservoir to the water separation device.

Because the support extends to the top of the side wall of the water reservoir, the compression that it is applied to the water reservoir by the support is localised to just the top of the side wall. Even if cheap plastics material is used to fabricate the water reservoir, it is comparatively easy to engineer the design of the water reservoir so that it is able to resist the compression in the localised vicinity of the top of the side wall, even in a demanding hot working environment.

Preferably, the water separation device comprises: a head having an inlet and an outlet for the fluid; and an intermediate component for separating water from the fluid; wherein the support is connected to the head, extends downwards and out of the first aperture in the base of the intermediate component, and clamps the intermediate component between the water reservoir and the head.

Usually, the intermediate component will be a filter element. If so, the apparatus will be an agglomerator.

According to a second aspect of the present invention, there is provided fluid treatment apparatus for separating water from a water-contaminated fluid, comprising: a water separation device having a downwardly opening, first aperture; a water reservoir including an annular side wall at the top of which is an upwardly opening, second aperture; and a support connected to the water separation device and projecting out of the first aperture and extending radially outwards so as to apply an upward clamping force to the base of the water separation device; wherein the support is connected to the top of the side wall of the water reservoir.

Because the clamping force is not transferred from the support to the base of the water separation device via the water reservoir, the water reservoir is not compressed by the clamping force and may therefore be made of a comparatively weak material such as cheap plastics material.

Preferably, the water separation device comprises: a head having an inlet and an outlet for the fluid; and an intermediate component for separating water from the fluid; wherein the support is connected to the head, extends downwards and out of the first aperture in the base of the intermediate component, and clamps the intermediate component between the support and the head.

Usually, the support comprises a central column and a load transfer device which extends radially outwards from the central column to the top of the side wall of the water reservoir.

According to a third aspect of the present invention, there is provided a component for fluid treatment apparatus for separating water from a water-contaminated fluid, the component comprising: a water reservoir comprising an annular side wall at the bottom of which is a base and at the top of which is an upwardly opening entrance aperture for separated water; and a support comprising (i) a central column which projects upwards from the entrance aperture of the water reservoir and (ii) a load transfer device which extends radially outwards from the central column and connects the column to the top of the side wall of the water reservoir.

In a preferred arrangement, the load transfer device comprises a plurality of arms extending radially outwards to an outer ring.

For ease of practical use, it is preferable that the load transfer device further comprises a central hub which is releasably connected to the central column.

In most embodiments, the water reservoir will be at least partially transparent. It will usually have the traditional bowl shape.

The structural cooperation between the support and the top of the side wall of the water reservoir may be achieved in a wide variety of ways.

For example, the water reservoir may be moulded to be integral with the support. The support may be made of metal, so that the resulting product is a combination of plastics and metal. Alternatively, the support and water reservoir may be made of the same plastics material (thus permitting a single moulding operation) or compatible plastics material (thus requiring two moulding operations).

The support may be screw-threadedly connected to the water reservoir.

The support may upwardly press against the water reservoir. This variant applies to the first aspect of the present invention.

Alternatively, the support may be releasably connected to the water reservoir by a connection of the push-and-twist type, e.g. as used to fit a light bulb in a light fitting.

The support and water reservoir may also be permanently connected together by techniques such as ultrasonic welding, other types of welding or using adhesives.

Non-limiting embodiments of the invention will now be described with reference to the accompanying drawings, in which.

Figure 1:
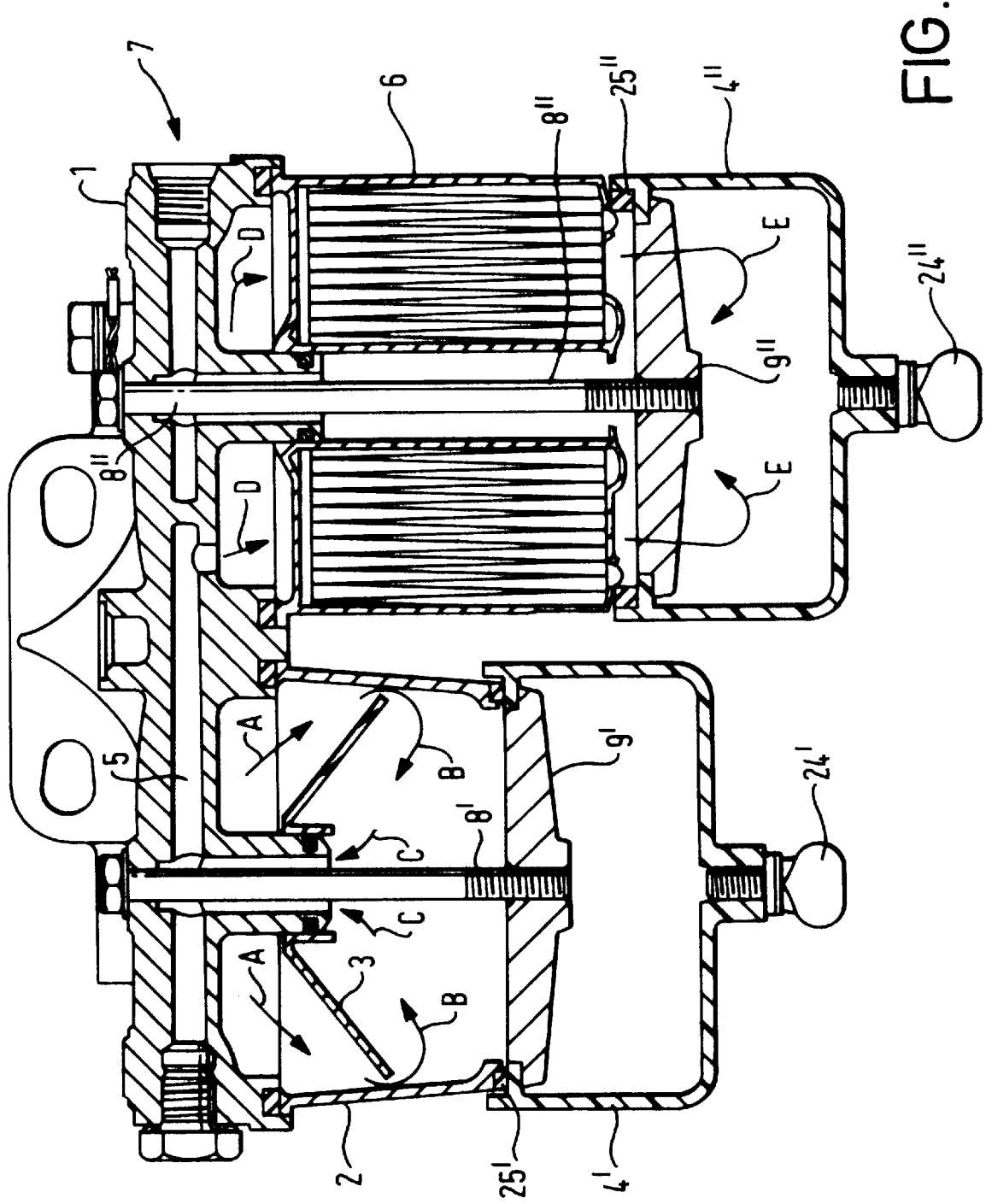
FIG. 1 is a sectional view through fluid treatment apparatus in accordance with the first aspect of the present invention.

Referring to FIG. 1, the fluid treatment apparatus comprises a combined sedimenter and agglomerator. The sedimenter is on the left side and the agglomerator is on the right side. There is a common metal head 1 at the top of the apparatus. Diesel fuel enters through an inlet (not shown) and is introduced into the top of a diffuser section 2. The fuel passes downwards in the direction of the arrows A and passes around the lower, outer edge of a diffuser cone 3 (see arrows B). The inwardly turning motion of the fluid causes dirt particles to drop down into a water reservoir 4'. Similarly, water is separated from the diesel fuel and also drops down into the water reservoir 4'. The fuel passes upwards in the direction of the arrows C and enters a passage 5 in the head 1 and is discharged downwards (arrows D) to pass through a filter element 6 which is of the replaceable cartridge type. The filter element 6 removes further dirt particles. Further water is separated from the fuel and drops down to the bottom of a water reservoir 4". The water separation occurs as the fuel flow exits from the bottom of the filter element 6 and turns inwards and upwards (arrows E) into a central tube of the filter element 6. The fuel then passes back up into the head 1 and exits from an outlet 7.

The sedimenter comprises the left-hand part of the head 1, the diffuser section 2 and the water reservoir 4'. The agglomerator comprises the right-hand part of the head 1, the filter element 6 and the water reservoir 4".

Each of the sedimenter and agglomerator is arranged so that its three components are stacked on top of each other. Each stack is clamped together by a support which comprises a central column 8', 8" and a load transfer device 9', 9".

Each central column 8', 8" is in the form of an elongate bolt whose head abuts against the top surface of the head 1. The bottom end of the bolt is screw threaded so as to permit a screw threaded connection to be formed to its associated load transfer device.

Figure 5:
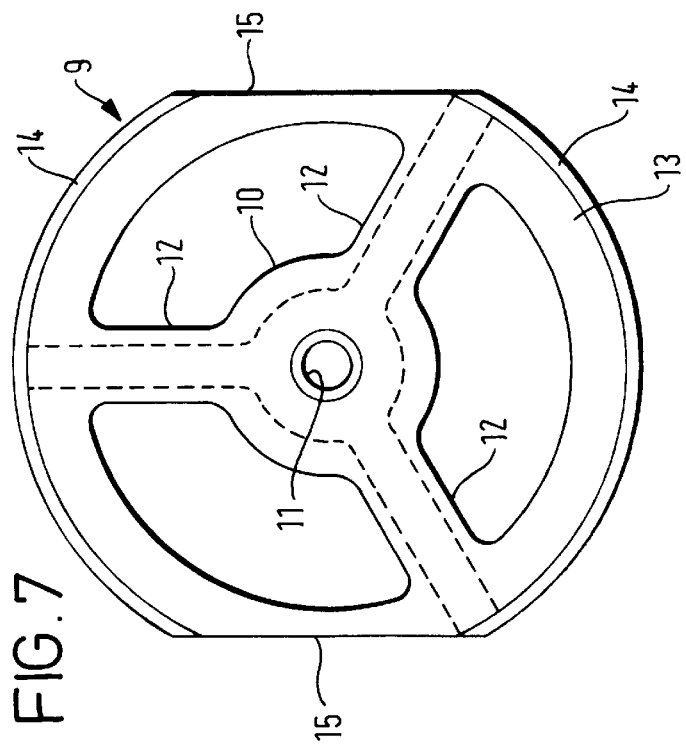
FIGS. 5 and 6 are plan and side views respectively of a first embodiment of the load transfer device.
Figure 6:
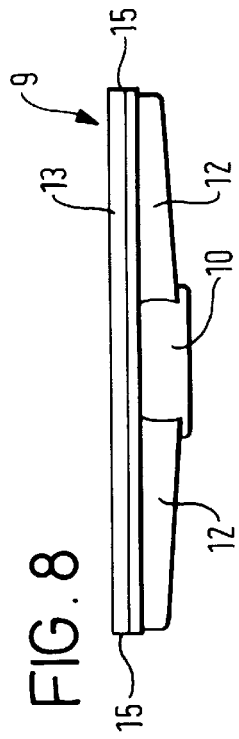
Figure 7:
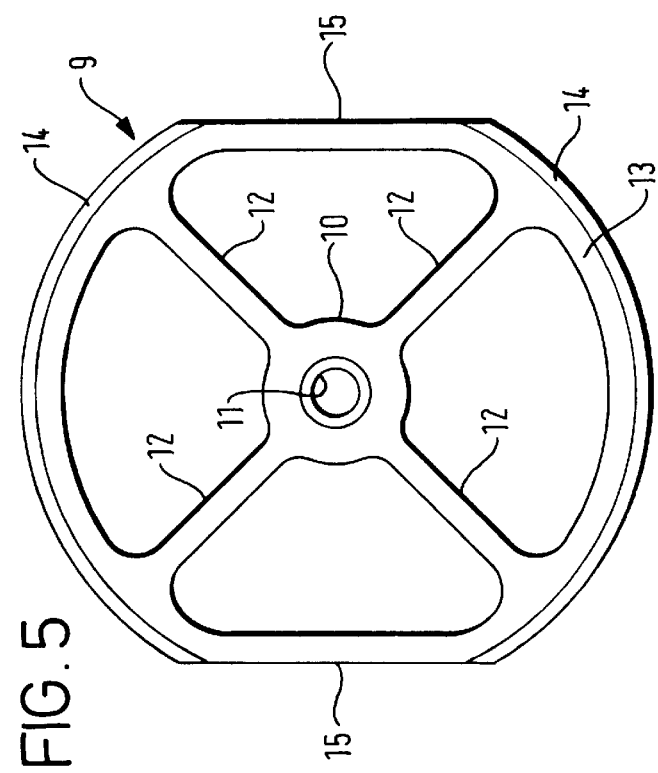
FIGS. 7 and 8 are plan and side views respectively of a second embodiment of the load transfer device.
Figure 8:
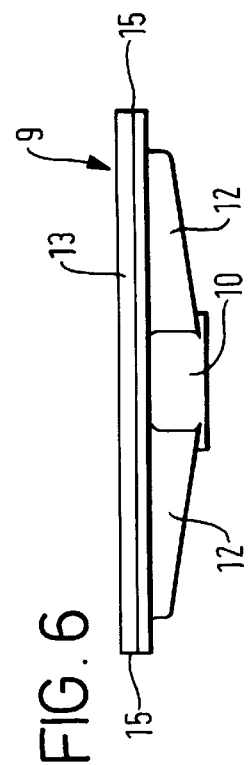

FIGS. 5 and 6 show a first embodiment of a load transfer device 9 suitable for use in the sedimenter and agglomerator shown in FIG. 1. FIGS. 7 and 8 illustrate an alternative embodiment of a suitable load transfer device 9.

Considering the load transfer device shown in FIGS. 5 and 6, it may be seen that it comprises a central hub 10 which has an internal screw thread 11 which permits the load transfer device 9 to be screwed to the lower end of the central column 8 in a releasable manner. Arms 12 extend radially outwards from the hub 10 to an outer ring 13. The outer ring 13 defines two curved surfaces 14 which lie on the circumference of a notional circle and are diametrically opposite each other. A pair of parallel side surfaces 15 extend between the ends of the curved surfaces 14. It may be seen that the width of the load transfer device 9 as measured between the side surfaces 15 is less than the diameter of the circle associated with the curved surfaces 14. As will be explained later, this reduced width enables the load transfer device to be inserted in the water reservoir 4.

The embodiment of the load transfer device 9 shown in FIGS. 7 and 8 differs slightly from the embodiment shown in FIGS. 5 and 6. The most significant difference is that it only has three arms 12.

Figure 2:
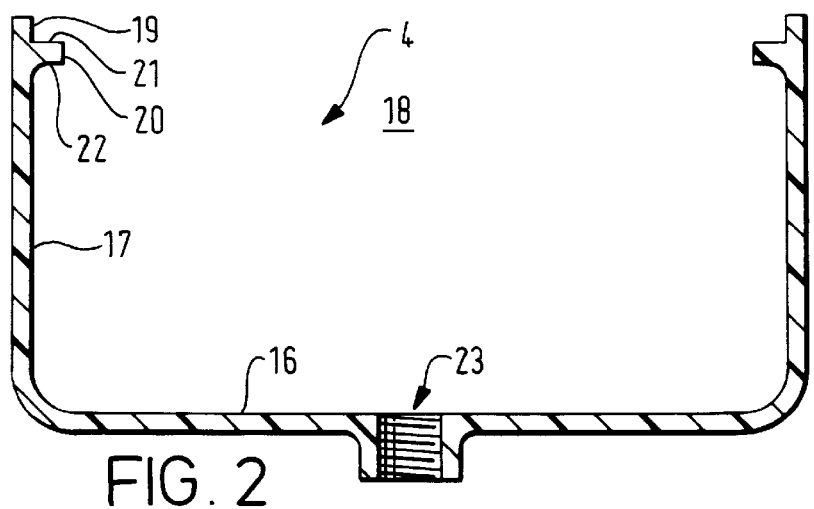
FIG. 2 is a sectional view through a water reservoir of the apparatus of FIG. 1.

FIG. 2 shows a water reservoir 4 which is the same as the water reservoirs 4', 4" shown in FIG. 1. As may be seen, the water reservoir 4 comprises a base 16 and a generally cylindrical side wall 17. The top end of the side wall 17 defines an upwardly facing aperture 18. The top of the side wall 17 comprises an upwardly pointing rim 19 and an inwardly pointing flange 20. The flange 20 has an upwardly facing surface 21 and a downwardly facing surface 22. The water reservoir 4 includes a drain 23 which contains a plug 24 (see FIG. 1) which may be removed in order to allow water which has collected in the water reservoir 4 to be drained away.

Figure 3:
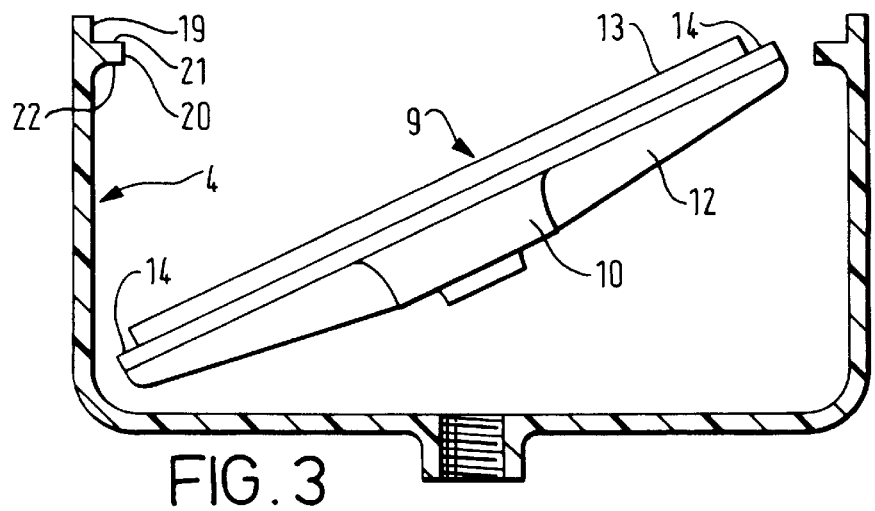
FIG. 3 illustrates how to insert a load transfer device of the apparatus into the water reservoir of FIG. 2.
Figure 4:
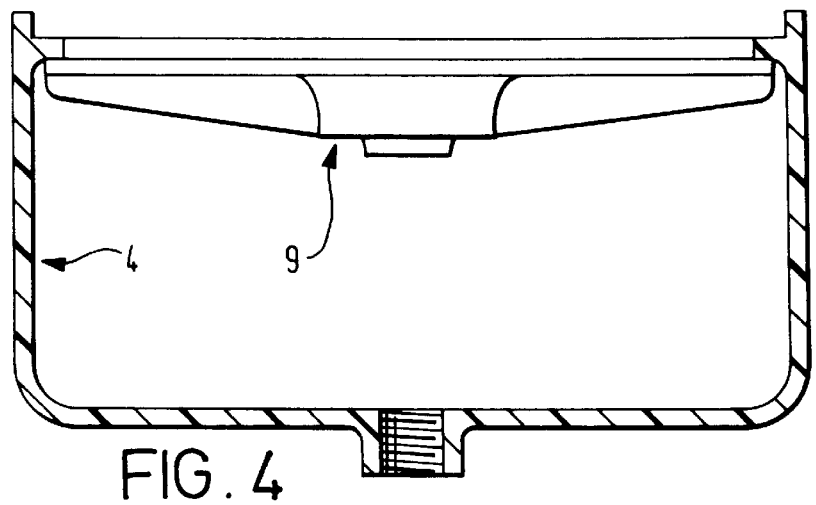
FIG. 4 illustrates the load transfer device and water reservoir of FIG. 3 when they have been assembled together.

FIGS. 3 and 4 show how the load transfer device 9 is inserted into the water reservoir 4. The surface 22 of the flange 20 is circular and has approximately the same diameter as the notional circle associated with the curved surfaces 14 of the load transfer device 9. For this reason, the load transfer device 9 is tipped slightly, so as to point downwards, as illustrated in FIG. 3. This enables one of the curved surfaces 14 to be inserted down into the water reservoir 4. Then, the side surfaces 15 of the load transfer device 9 pass through the aperture defined by the flange 20 because of the fact that the width between the side surfaces 15 is less than the diameter of the flange 20. Then, the other one of the curved surfaces 14 is passed below the flange 20.

As illustrated in FIG. 4, the load transfer device 9 is then returned to the horizontal and moved upwards so as to bring its curved surfaces 14 into abutment against the annular surface 22 of the flange 20.

The water reservoir 4 may be attached to the load transfer device 9 by gluing or by means of an interference fit between the aperture of the flange 20 and the outer ring 13. The load transfer device 9 is usually made of a metal such as aluminium. The preferred material for the reservoir 4 is plastics material. This being the case, instead of physically assembling the two components in the manner illustrated in FIGS. 3 and 4, it would be possible for the load transfer device 9 to be inserted in a mould used to produce the water reservoir 4 so that the two components are moulded together to form an integral component.

After assembly to the state shown in FIG. 4, it is then necessary to screw the hub 10 of the load transfer device 9 to the bottom of the central column 8. In so doing, an annular seal 25', 25" is trapped between the upwardly facing surface 21 of the flange 20 of the water reservoir 4' and an outer peripheral surface of the diffuser section 2 or the filter element 6.

The tension in the central column 8 is transferred via the load transfer device 9 to the flange 20 of the water reservoir 4. This produces a clamping force that compresses the flange 20 and serves to clamp together each vertical stack of components. In the case of the sedimenter, the diffuser section 2 is clamped between the head 1 and the water reservoir 4'. In the case of the agglomerator, the filter element 6 is clamped between the water reservoir 4" and the head 1.

There is a downwardly facing aperture at the bottom end of the diffuser section 2. Similarly there is a downwardly facing aperture at the bottom end of the filter element 6. Each of these downwardly facing apertures is in fluid communication with the upwardly facing aperture 18 of the reservoir 4 when all of the components have been clamped together.

It may be seen from FIG. 1 that the clamping force provided by the load transfer device 9 is localised to the top part of the side wall 17 of the water reservoir 4. Thus, the bottom part of the side wall 17 of the water reservoir 4 is not placed under compressive load by the clamping force. This permits the water reservoir 4 to be moulded from a low-cost plastics material such as cellulose acetate butyrate.

The shape of the arms 12 of the load transfer device 9 may be such as to assist in the physical separation of dirt particles and water from the fuel. However, the primary function of the arms 12 is to link the hub 10 to the outer ring 13 in a sufficiently strong and rigid manner.

Figure 9:
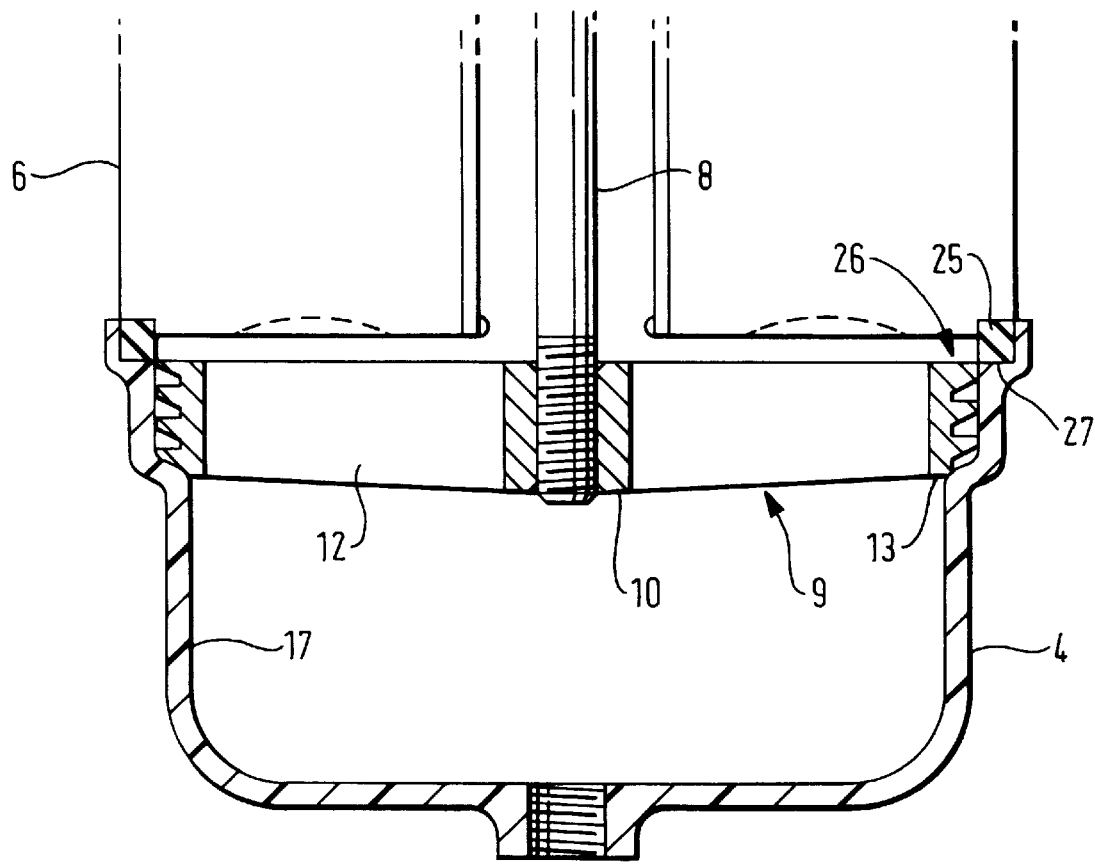
FIG. 9 is a sectional view similar to part of FIG. 1 but showing an alternative embodiment of a load transfer device and a water reservoir.

FIG. 9 illustrates an alternative embodiment of the first aspect of the present invention. It shows the lower part of an agglomerator similar to the agglomerator shown in FIG. 1. The differences between the embodiment of FIG. 1 and the embodiment of FIG. 9 reside in the water reservoir 4 and the load transfer device 9. Many of the components are similar and are numbered accordingly. The main differences are that the water reservoir 4 does not have a flange 20 and the load transfer device 9 does not have curved surfaces 14 or flat side surfaces 15. Instead, the outer ring 13 of the load transfer device 9 is connected to the top end of the side wall 17 by means of a screw thread connection achieved by providing a screw thread on the inner surface of the top end of the side wall 17 and on the outer peripheral surface of the outer ring 13. The screw thread connection is illustrated at 26. The annular seal 25 sits on an upwardly facing annular surface 27 which is radially outwards of the screw thread connection 26.

Figure 10:
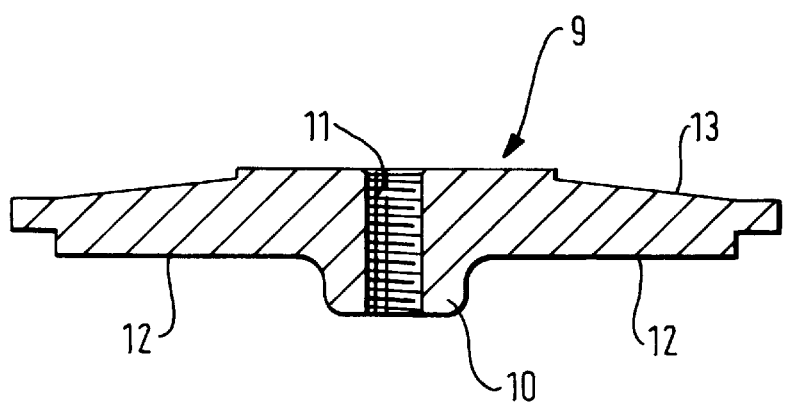
FIGS. 10 to 15 illustrate a further alternative embodiment of a load transfer device and a water reservoir for use in the apparatus of FIG. 1.
Figure 11:
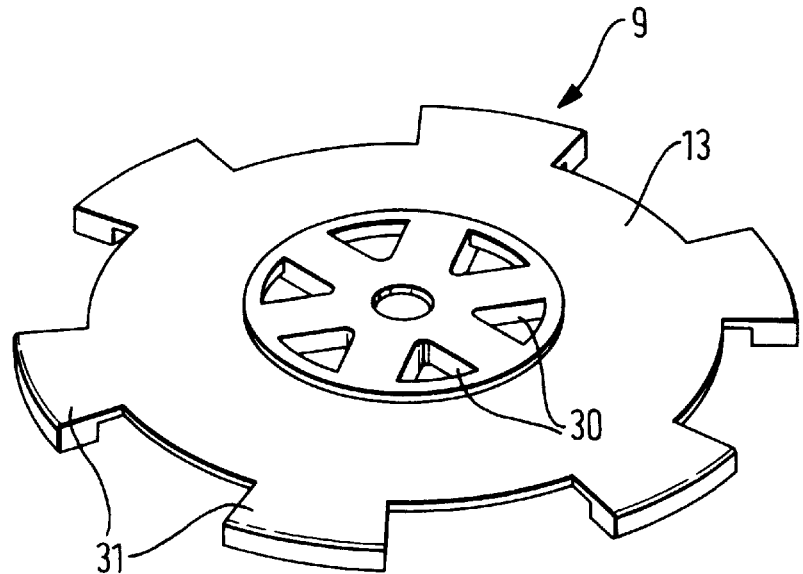
Figure 12:
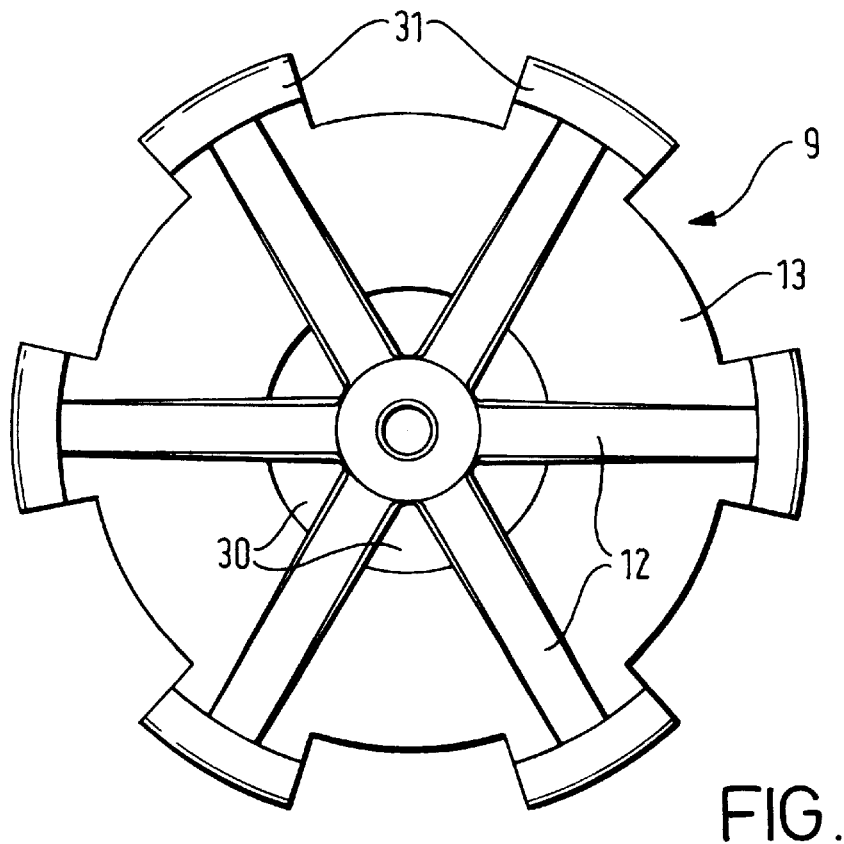
Figure 13:
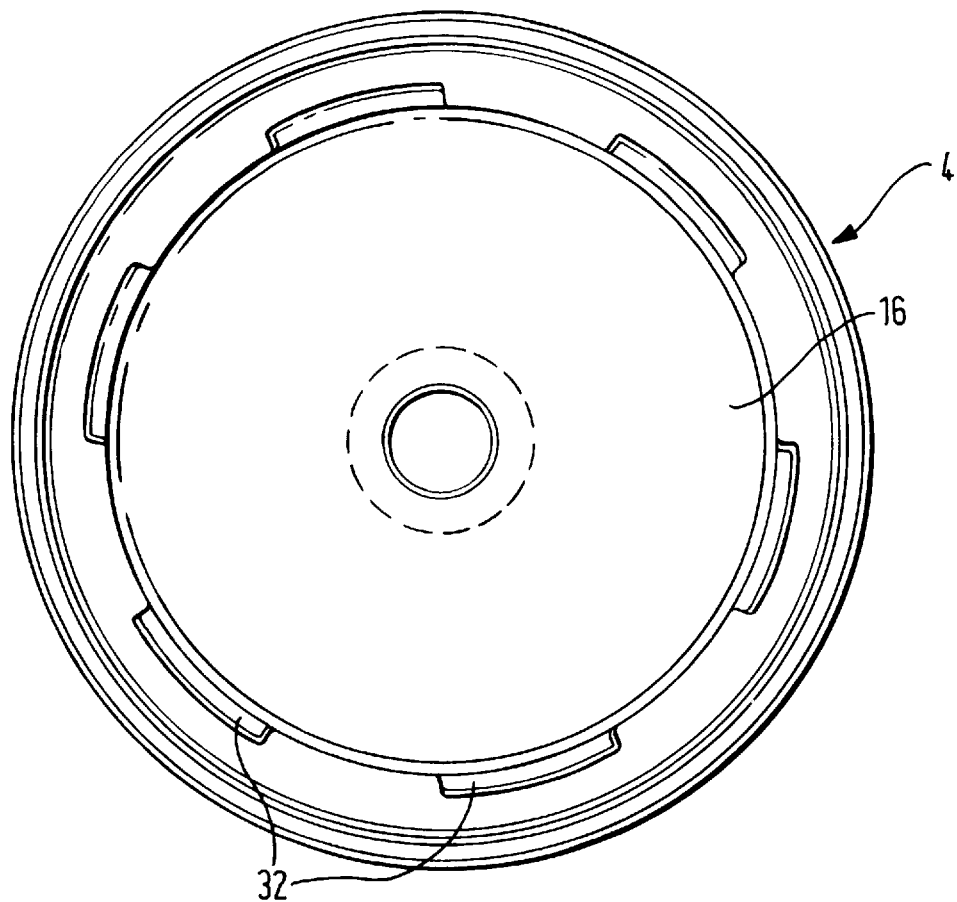
Figure 14:
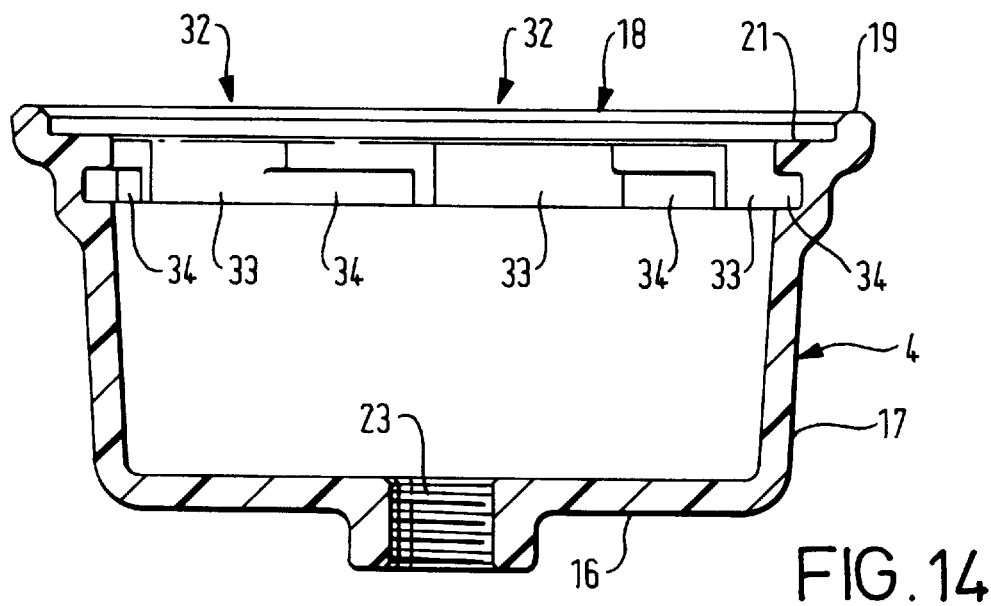
Figures 15, 16:
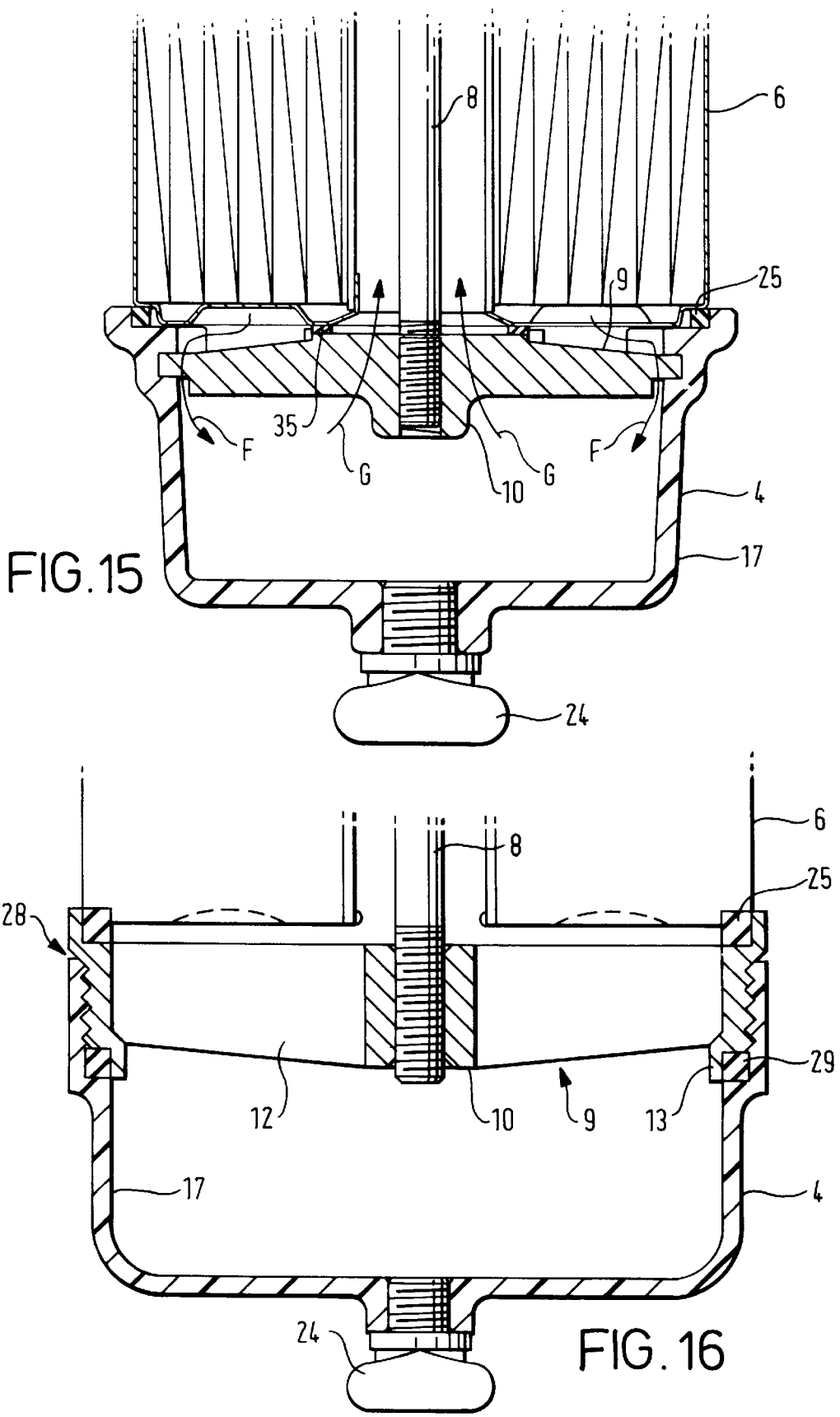
FIG. 16 is a sectional view through the lower part of fluid treatment apparatus in accordance with the second aspect of the present invention.

FIGS. 10 to 15 illustrate a further alternative embodiment of the first aspect of the present invention. FIGS. 10, 11 and 12 are sectional, perspective and underneath plan views respectively of a preferred form of the load transfer device. FIGS. 13 and 14 are plan and sectional views respectively of a preferred form of the water reservoir. FIG. 15 is a sectional view and shows the lower part of an agglomerator similar to the agglomerator shown in FIG. 1. In FIG. 15, the load transfer device of FIGS. 10–12 and the water reservior of FIGS. 13 and 14 are shown assembled together. For components of FIGS. 10–15 which are similar to components of the embodiment of FIGS. 1–8, the same reference numerals are used. The distinguishing characteristics of the embodiment of FIGS. 10–15 will now be described.

With regard to the load transfer device 9 shown in FIGS. 10–12, there are six arms 12 on top of which is positioned the outer ring 13. There are six through apertures 30 positioned radially between the outer ring 13 and the central hub 10.

At the end of each arm 12 is a radially-outwardly projecting projection 31. The six projections 31 are therefore spaced apart around the outer periphery of the outer ring 13. Although not discerable in FIGS. 10–12, each projection 31 has a thickness which tapers slightly in the circumferential direction.

With regard to the water reservoir 4 shown in FIGS. 13 and 14, the special features of this embodiment are mainly incorporated at the top of the side wall 17. There are six grooves 32 which are spaced around the inwardly facing face of the top of the side wall 17. Each groove 32 comprises a downwardly descending entry portion 33 which leads to a circumferentially extending end portion 34.

Although not visible in FIGS. 13 and 14, each end portion 34 has a height which tapers slightly in the circumferential direction.

When assembling the load transfer device 9 and water reservoir 4 of FIGS. 10–14, the load transfer device 9 is positioned above the water reservoir 4 with each one of the six projections 31 being positioned above a respective one of the grooves 32. The load transfer device 9 is then lowered so as to locate the projections 31 in the entry portions 33 of the respective grooves 32. The two components are pushed together until the projections 31 reach the bottoms of the entry portions 33. Then the load transfer device 9 is twisted relative to the water reservoir 4 so as to move the projections 31 circumferentially along the end portions 34 of the grooves 32. Because of the cooperative taper arrangements present on the projections 31 and in the end portions 34, this twisting action has the effect of frictionally locking the load transfer device 9 to the water reservoir 4.

In order to disassemble the two components, they must be untwisted (i.e. twisted in the reverse direction) and then pulled apart.

Instead of using the technique of frictional locking, the projections 31 and end portions 34 of the grooves 32 may be so arranged that the projections become mechanically locked in the end portions during the twisting action of the assembly operation.

FIG. 15 shows the assembled condition of the load transfer device 9 of FIGS. 10–12 and the water reservoir of FIGS. 13 and 14. The fuel which exits from the bottom of the filter element 6 passes down into the water reservoir 4 by passing through the six gaps which exist between the outer periphery of the outer ring 13 and the side wall 17 (see arrows F). The fuel then flows radially inwards and then upwards through the apertures 30 (see arrows G). An annular bellows seal 35 is positioned between the filter element 6 and the load transfer device 9 in order to prevent the fuel flow from bypassing the water reservoir 4.

The top and bottom surfaces of the outer ring 13 are slightly conical in order to encourage fuel which is above the load transfer device 9 to flow radially outwards (see arrows F) and fuel which is below the load transfer device 9 to flow radially inwards (see arrows G). This enforced flow outwards and then inwards assists in separating water from the fuel.

Six arms 12 and six projections 31 are illustrated in this particular embodiment. However, the number may be varied in order to suit the particular design requirements. Thus, the number of arms could be reduced to four, particularly if they are no longer planar but instead project slightly upwards in addition to radially outwards from the central hub 10. The slight upward tilt of the arms 12 helps the load transfer device 9 to transmit the force applied by the central column 8 to the top of the side wall of the water reservoir.

If, for example, only four arms 12 are being used, it would be usual to reduce the number of projections 31 accordingly so that there are only four projections. Similarly, there would be only four grooves 32.

Annular baffles (not shown) may depend downwardly from the inner and outer annular edges of the outer ring 13 to define an annular chamber for collecting bubbles which separate from the fluid, and a small orifice may bleed the collected air from the chamber into the central tube of the filter element 6. The slightly conical nature of the bottom surface of the outer ring 13 would serve to direct the collected air towards the orifice. A full description of this concept is given in our European Patent Application No. 95305773.4.

An embodiment of the second aspect of the present invention is shown in FIG. 16. FIG. 16 shows the lower part of an agglomerator which is generally similar to the agglomerator of FIG. 1. Many of the components are similar and are numbered accordingly. The primary differences between FIG. 16 and FIG. 1 will now be described. As shown in FIG. 16, the load transfer device 9 is such that the outer ring 13 has a bigger diameter than for the embodiment of FIG. 1. As a result, the outer ring 13 applies a clamping force upwards onto the base of the filter element 6 via the annular seal 25. In other words, there is no part of the water reservoir 4 which is interposed between the load transfer device 9 and the base of the filter element 6. Instead, the external periphery of the outer ring 13 has a screw thread which engages with a screw thread on the internal periphery at the top end of the side wall 17 of the water reservoir 4. This screw thread connection is indicated generally at 28. An annular seal 29 is trapped between the annular bottom edge of the outer ring 13 and an upwardly facing annular ledge surface of the side wall 17.

Because the clamping force applied by the column 8 and load transfer device 9 to the base of the filter element 6 does not pass through any part of the water reservoir 4, the water reservoir may be made of cheap plastics material.

I claim:

1. A fluid treatment apparatus for separating water from a water contaminated fluid, comprising:

a head having an inlet and an outlet for the fluid;

an intermediate component for separating water from the fluid, said intermediate component having a base with a downwardly opening, first aperture;

a water reservoir including an annular side wall having a top at which is an upwardly opening, second aperture; and a support connected to said head, and which extends downwardly through said intermediate component and out of said first aperture in said base of said intermediate component and into said second aperture, and which extends to and engages with said top of said side wall of said water reservoir and applies an upward clamping force to said top of said side wall so as to clamp said water reservoir to said intermediate component and said intermediate component to said head;

wherein the support is releasably connected to the top of the side wall of the water reservoir by a connection of the type requiring assembly to be performed by pushing together the support and the water reservoir and then twisting the support and the water reservoir relative to each other and disassembly to be preformed by untwisting the support and the water reservoir and then pulling apart the support and water reservoir;

wherein said side wall of said reservoir has an inwardly facing face and said support has a periphery and a plurality of projections which are spaced apart around said periphery of said support and which project radially outwards, said water reservoir having a corresponding plurality of grooves which are spaced apart around said inwardly facing face of said side wall of said water reservoir, said projections and grooves being arranged so that said projections become frictionally locked in said grooves when said support is twisted relative to said reservoir; and wherein the projections and grooves taper in the circumferential direction so as to achieve the frictional locking effect during the twisting action of the assembly operation.

\* \* \* \* \*